United States Patent
Greiner et al.

(10) Patent No.: US 8,448,164 B2
(45) Date of Patent: May 21, 2013

(54) SOA-REGISTRY, METHOD AND PLATFORM MANAGER FOR AUTOMATIC SOA APPLICATION DEPLOYMENT

(75) Inventors: Markus Greiner, Ober-Ramstadt (DE); Kay Hans-Peter Winkler, Darmstadt (DE); Harald Schöning, Dieburg (DE); Udo Hafermann, Darmstadt (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 959 days.

(21) Appl. No.: 12/458,031

(22) Filed: Jun. 29, 2009

(65) Prior Publication Data

US 2010/0042986 A1    Feb. 18, 2010

(30) Foreign Application Priority Data

Aug. 18, 2008  (EP) .................................... 08014627

(51) Int. Cl.
*G06F 9/445*    (2006.01)
(52) U.S. Cl.
USPC ........................................ 717/174; 717/177
(58) Field of Classification Search ............ 717/174–178
See application file for complete search history.

(56) References Cited

U.S. PATENT DOCUMENTS

| | | | | |
|---|---|---|---|---|
| 6,163,878 A * | 12/2000 | Kohl | | 717/100 |
| 7,770,151 B2 * | 8/2010 | Sanjar et al. | | 717/109 |
| 7,870,550 B1 * | 1/2011 | Qureshi et al. | | 717/174 |
| 7,987,146 B2 * | 7/2011 | Shwartz et al. | | 706/45 |
| 7,996,814 B1 * | 8/2011 | Qureshi et al. | | 717/120 |
| 8,069,435 B1 * | 11/2011 | Lai | | 717/106 |
| 2003/0158919 A1 * | 8/2003 | Fomenko | | 709/220 |
| 2003/0236882 A1 * | 12/2003 | Yan et al. | | 709/225 |
| 2004/0128345 A1 * | 7/2004 | Robinson et al. | | 709/203 |
| 2004/0148184 A1 * | 7/2004 | Sadiq | | 705/1 |
| 2004/0225952 A1 * | 11/2004 | Brown et al. | | 714/819 |
| 2004/0249645 A1 * | 12/2004 | Hauser et al. | | 705/1 |
| 2004/0255291 A1 * | 12/2004 | Sierer et al. | | 717/174 |
| 2005/0144226 A1 * | 6/2005 | Purewal | | 709/203 |
| 2005/0204354 A1 * | 9/2005 | Sundararajan et al. | | 717/174 |
| 2005/0256882 A1 * | 11/2005 | Able et al. | | 707/10 |
| 2005/0289536 A1 * | 12/2005 | Nayak et al. | | 717/174 |
| 2006/0206890 A1 * | 9/2006 | Shenfield et al. | | 717/174 |
| 2006/0230314 A1 * | 10/2006 | Sanjar et al. | | 714/26 |
| 2006/0242195 A1 * | 10/2006 | Bove et al. | | 707/103 R |
| 2006/0248121 A1 * | 11/2006 | Cacenco et al. | | 707/200 |
| 2006/0248506 A1 * | 11/2006 | Luo et al. | | 717/104 |

(Continued)

OTHER PUBLICATIONS

Effective SOA Deployment: Using an SOA Registry Directory, Sep. 2005, Sun Microsystems.*

(Continued)

*Primary Examiner* — Wei Zhen
*Assistant Examiner* — Daniel P Elliott
(74) *Attorney, Agent, or Firm* — Nixon & Vanderhye PC

(57) ABSTRACT

A computing system includes a service-oriented architecture (SOA) registry that includes an SOA-application description, an abstract component description, a concrete component description, and a platform description. The SOA-application description is related to the abstract component description of a component of the SOA-application. The concrete component description includes a requirement of a respective component for a target platform. The platform descriptor describes a property of the target platform. The computing system is configured to deploy the SOA-application and its respective components to the target platform in accordance with the concrete descriptions.

15 Claims, 4 Drawing Sheets

U.S. PATENT DOCUMENTS

Figure 1:
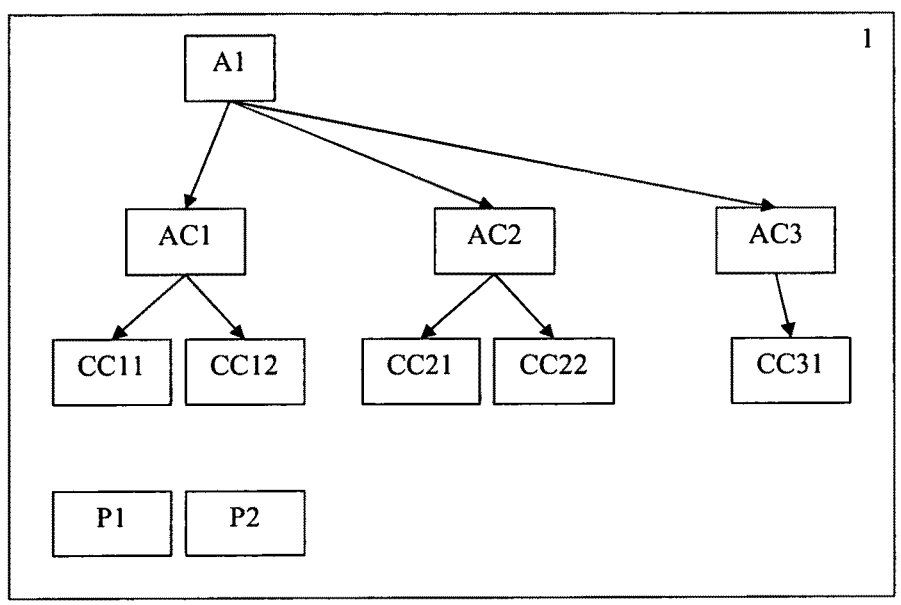

| | | | | |
|---|---|---|---|---|
| 2006/0271581 | A1* | 11/2006 | Sanjar et al. | 707/102 |
| 2006/0282516 | A1* | 12/2006 | Taylor et al. | 709/220 |
| 2007/0061487 | A1* | 3/2007 | Moore et al. | 709/246 |
| 2007/0260629 | A1* | 11/2007 | Tseitlin et al. | 707/102 |
| 2008/0189679 | A1* | 8/2008 | Rodriguez et al. | 717/105 |
| 2008/0195598 | A1* | 8/2008 | Mintchev | 707/5 |
| 2009/0112646 | A1* | 4/2009 | Bruce et al. | 705/7 |
| 2009/0268883 | A1* | 10/2009 | Agapi et al. | 379/88.04 |
| 2009/0288078 | A1* | 11/2009 | Makonahalli et al. | 717/174 |
| 2010/0017783 | A1* | 1/2010 | Brininstool et al. | 717/101 |

OTHER PUBLICATIONS

"Deployment and Configuration of Distributed Systems", Hoffmann et al., Lecture in Computer Science, vol. 3319/2005, Jan. 27, 2005.

"Deployment in Dynamic Environments", Ruiz et al., Internet Article and Décor '04, Oct. 28, 2004—1ére Conférene Francophone suer le Déploiement et la (Re) "Configuration de Logiciels" Internet Article, Jan. 1, 2009.

"Using Connectors for Deployment of Heterogeneous Applications in the Context of OMG D&C Specification", Belej et al., Interoperability of Enterprise Software and Applications (Online), Jul. 4, 2006.

"CADeComp: Context-Aware Deployment of Component-Based Applications", Ayed et al., Journal of Network and Computer Applications Academic Press, New York, vol. 31, No. 3, Aug. 1, 2009.

"OWL Web Ontology Language XML Presentation Syntax", Hori et al., Jun. 11, 2003.

* cited by examiner

| P1 | |
|---|---|
| OperatingSystem | Solaris 10 |
| ProgrammingLanguages | Java 1.4.2 Update 7 |
| ServletEngine | Tomcat 5.5.1.17 |
| WebServiceStack | Axis v2 1.4 |
| Databases | Tamino 4.4, Oracle ... |

| P2 | |
|---|---|
| OperatingSystem | Solaris 11 |
| ProgrammingLanguages | Java 1.4.2 Update 8 |
| ServletEngine | Tomcat 5.5.1.15 |
| WebServiceStack | Axis v2 1.2 |
| Databases | Tamino 4.4 |

Fig. 4

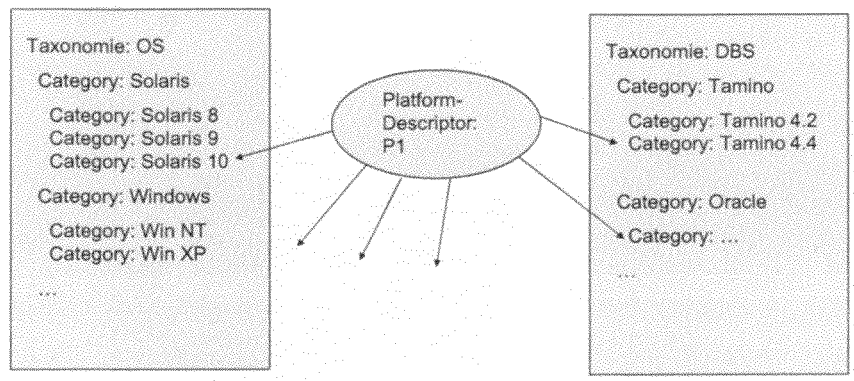

Fig. 5

```
<requirements componenttype="Service" componentname="R1">
   <requirement type="os">
      <type>Solaris</type>
      <vers><gt>9</gt></vers>
   </requirement>
   <requirement type="pl">
      <type>Java</type>
      <or>
         <vers>1.4.2_07</vers>
         <vers>1.4.2_09</vers>
      </or>
   </requirement>
   <requirement type="se">
      <type>Tomcat</type>
      <mainvers>5.5</mainvers>
   </requirement>
   <requirement type="wss">
      <type>Axis</type>
      <mainvers>Axis2</mainvers>
   </requirement>
   <requirement type="db">
      <type>Tamino</type>
   </requirement>
</requirements>
```

Fig. 6

```
<report>
...
    <instantiation abscomptype="Service" abscompname="Read">
        <deployment comptype="Service" compname="R1"
            outcome="failed">
            <mismatch>
                <requirement type="pl">
                    <type>Java</type>
                    <or>
                        <vers>1.4.2_07</vers>
                        <vers>1.4.2_09</vers>
                    </or>
                </requirement>
                <prerequisite>
                    <tax>ProgrammingLanguages</tax>
                    <cat>Java 1.4.2 Update 8</cat>
                </prerequisite>
            </mismatch>
        </deployment>
        <deployment comptype="Service" compname="R21" outcome="...">
            ...
    </instantiation>
...
</report>
```

US 8,448,164 B2

SOA-REGISTRY, METHOD AND PLATFORM MANAGER FOR AUTOMATIC SOA APPLICATION DEPLOYMENT

This application claims priority to European Application No. 08014627.7 filed 18 Aug. 2008, the entire contents of which is hereby incorporated by reference.

1. TECHNICAL FIELD

The present invention relates to a SOA-registry, a method and a platform manager for the automatic deployment of SOA applications onto platforms.

2. THE PRIOR ART

Modern software applications typically comprise a number of distinct components each implementing parts of the application. The components work together in order to provide the functionality of the overall application. In this context, the concept of a service oriented architecture (SOA) is increasingly used, wherein loosely coupled SOA-components such as e.g. web services perform the processing logic and communicate with other SOA-components such as e.g. databases, web servers, etc. Descriptions of these SOA-components may be stored in a SOA-registry, i.e. the SOA-registry comprises entries which represent the SOA-components.

In the prior art approach to the development of such a SOA-application, it is necessary to tailor the SOA-application to the platform it is supposed to be deployed on. For example if the SOA-application uses a data store to store its information, a certain database product would be selected to implement this data store functionality and the other SOA-components would be designed so that they can access this database.

During the life-cycle of a SOA-application, it is sometimes necessary to redeploy the SOA-application onto different target platforms, e.g. onto a development platform where the parts of the SOA-application are developed, a testing platform to run application tests and finally a production platform when the development of the SOA-application is finished.

However, each of the different platforms may have different specific properties, like e.g. operating systems, available languages, etc. Furthermore, the exemplary data store functionality described above may be implemented by the above-mentioned database on the production platform, but may be implemented by a file-based storage on the development platform.

In the prior art approaches, it is in this context necessary to manually perform costly, time-consuming and error-prone adaptations of the components of a SOA-application when redeploying the SOA-application onto a new platform, even though the actual functionality, in the example the data store, is the same on all platforms.

In view of the above, it is therefore the technical problem underlying the present invention to efficiently automate the deployment of a SOA-application onto platforms, thus at least partly overcoming the disadvantages of the prior art.

3. SUMMARY OF THE INVENTION

This problem is according to one aspect of the invention solved by a SOA-registry for the automatic deployment of at least one SOA-application onto at least one platform, the at least one SOA-application comprising one or more components, the SOA-registry comprising:

a. at least one SOA-application description being related to one or more abstract component descriptions describing the components of the at least one SOA-application;
b. at least one concrete component description for each of the one or more abstract component descriptions, the at least one concrete component description comprising one or more requirements of the respective component on a target platform; and
c. at least one platform descriptor comprising one or more properties of the at least one platform;

Accordingly, the embodiment defines a SOA-registry which comprises a two-layered architecture representing SOA-application components both in a concrete and in an abstract form, as well as a relation between the two layers. In the uppermost layer, the SOA-application and its components are preferably described in abstract (platform-independent) terms. In the lower layer, the registry entries representing abstract (platform-independent) application components are each related to (zero-to-n) entries representing concrete (platform-specific) application components, i.e. components adapted for a certain target platform which may have one or more requirements on a target platform. Examples of such requirements may be a specific version of an operating system or runtime environment. Furthermore, the registry may comprise so-called platform descriptors that bundle information on a specific platform, e.g. the provided operating system, etc. Given a certain target platform, this allows for applying an installation procedure (see below) on the abstract descriptions and thus provides more flexibility in the deployment process.

In one aspect of the invention, the one or more properties of the at least one platform may comprise names and/or version numbers of provided platform components. In another aspect of the invention, the one or more requirements may comprise names and/or version numbers of required platform components and any number of logical operators.

Accordingly, this allows for the definition of complex requirements of a component needed to run on a specific platform, e.g. by defining a minimum required version, as further outlined in the detailed description below. In a deployment procedure, a suitable component can be selected based on the requirements of the components and the properties of the target platform.

In another aspect of the invention, the one or more requirements and/or the one or more properties of the at least one platform are described by at least one ontology. Ontologies allow for a formal definition of entities in a certain domain as well as their relationships. Using standard description languages like e.g. the Web Ontology Language (OWL) specified by the World Wide Web Consortium (W3C) allows for software applications to "understand" and process such ontologies.

According to a further aspect of the present invention, a method is provided for the automatic deployment of at least one SOA-application onto at least one platform, the at least one SOA-application comprising one or more components, the method comprising the following steps:

a. selecting a SOA-application description of the at least one SOA-application and a platform descriptor of the at least one platform from a SOA-registry according to any of the above SOA-registries;
b. for each of the one or more abstract component descriptions of the selected application description, selecting one of the at least one concrete component descriptions; and
c. deploying the components corresponding to the selected concrete component descriptions onto the platform.

The method preferably receives two input parameters, namely a SOA-application description of the SOA-application to be deployed and a platform descriptor of the target platform. Preferably, the parameters are pointers to entries of a SOA-registry as defined above. A concrete component description is selected for every abstract component of the SOA-application, i.e. for the corresponding abstract component description in the SOA-registry, and the corresponding component is deployed onto the target platform.

In another aspect of the invention, the selection in step b. may comprise testing, for each of the at least one concrete component descriptions, if the one or more requirements are satisfied by the platform corresponding to the platform descriptor, and selecting the first matching concrete component description. Accordingly, the selection of the components is based on the requirements of the concrete component descriptions and the properties of the platform defined in the platform descriptor. Examples of the selection procedure can be found in the detailed description below.

Furthermore, the testing in step b. may be performed by comparing the one or more requirements and the one or more properties of the at least one platform by inference. This is especially advantageous if the requirements and/or the platform properties are described by ontologies, as further outlined in the detailed description below.

According to another aspect of the invention, the deployment in step c. may only be performed if, for each of the one or more abstract component descriptions, at least one of the concrete component descriptions can be selected. This ensures that the SOA-application, i.e. its components, is only deployed if each of the components are able to run on the target platform, otherwise none of the components is deployed.

In yet another aspect of the invention, the method may further comprise the step of generating a report describing which component has been deployed for each of the one or more abstract component descriptions.

Further advantageous modifications of embodiments of the SOA-registry and the method of the invention are defined in further dependent claims.

Finally, the invention also concerns a platform manager for the automatic deployment of at least one SOA-application onto at least one platform, the at least one SOA-application comprising one or more components, the platform manager being adapted for implementing any of the above defined methods.

4. SHORT DESCRIPTION OF THE DRAWINGS

Figures 2, 3:
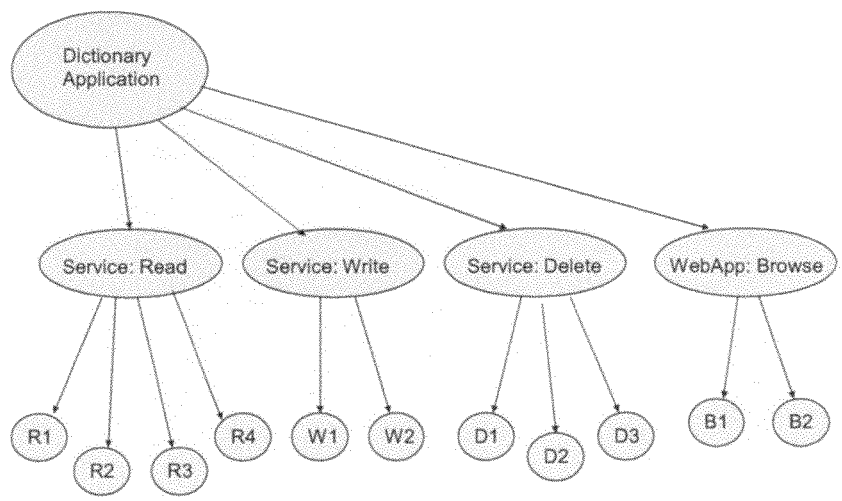

In the following detailed description, presently preferred embodiments of the invention are further described with reference to the following figures:

FIG. 1: A schematic view of an exemplary SOA-registry according to an embodiment of the present invention;

FIG. 2: An exemplary application comprising four abstract components;

FIG. 3: An example of properties of two exemplary platforms;

FIG. 4: Two exemplary taxonomies of platform properties;

FIG. 5: An exemplary XML listing of requirements of a component;

FIG. 6: An exemplary XML listing of a report;

5. DETAILED DESCRIPTION

In the following, a presently preferred embodiment of the invention is described with respect to a SOA-registry 1 as schematically shown in FIG. 1. As can be seen, the exemplary SOA-registry 1 comprises a representation of a SOA-application, i.e. it stores a SOA-application description A1. The SOA-application description A1 is related to three abstract component descriptions AC1, AC2, AC3, which are related to the concrete component descriptions CC11, CC12, CC21, CC22 and CC31. FIG. 1 further depicts two platform descriptors P1 and P2. The SOA-registry 1 preferably comprises one representation (SOA-application description) per real SOA-application and one representation (concrete component description) per real component respectively. Thus, the terms "SOA-application" and "SOA-application description", "component" and "concrete component description" etc. may be used interchangeably in the following.

Preferably, each of the abstract component descriptions AC1, AC2, AC3 is a representation of one piece of functionality of the SOA-application A1, like certain services the SOA-application A1 offers or different components (web browser, backend server, etc.) the SOA-application A1 is comprised of. As already described above, the abstract component descriptions AC1, AC2, AC3 define the components of the SOA-application A1 in abstract, i.e. platform-independent terms in that they do not provide any detailed technical specification of the components.

One way of instantiating the SOA-application A1 (i.e. implementing the application on a real platform) according to the prior art would be to manually provide concrete instantiations for the abstract component descriptions AC1, AC2, AC3. This could e.g. be achieved by downloading and installing a Java Development Kit (JDK), a Tamino database, a Tomcat server and Axis, writing services in Java using the Tamino Java API, compiling them and deploying them using the appropriate Axis tool. Web applications could be e.g. implemented as Java Server Pages (JSP). However, such a manual implementation of the components of an application is difficult, inefficient and, more importantly, introduces a high risk of inserting errors in the implementation which may result in an application which does not work as expected or which crashes in the worst case.

Therefore, the SOA-registry 1 further comprises preferably more than one concrete component description CC11, CC12, CC21, CC22, CC31 for each of the abstract component descriptions AC1, AC2, AC3. However, this is not a requirement of the present invention and the SOA-registry 1 may as well comprise only one concrete component description per abstract component description. The concrete component descriptions CC11, CC12, CC21, CC22, CC31 are preferably related to real components, e.g. by comprising a link to a code file of the real component. Another example is a concrete component description CC11, CC12, CC21, CC22, CC31 of a web application component like a web browser, which comprises a link to a corresponding war-file. The concrete component descriptions CC11, CC12, CC21, CC22, CC31 may also comprise further information needed to deploy the respective component.

This information may be structured in a type/name-fashion. All deployment considerations not specific to the actual object, but to its type, are attached to the type. E.g. the fact that Tomcat is available from a certain web address is a bit of information attached to a type "Tomcat Application Server". Objects of the type "Java Service" contain pointers to their Java code files individually, i.e. attached to the name, but the information that Java Services need to be deployed in a certain way belongs to the type itself.

Since abstract component descriptions AC1, AC2, AC3 are platform-independent definitions, preferably no real counterparts exist. The relationships between the abstract and the concrete layer described above may e.g. be implemented by references between the registry-entries. It should be noted that although the examples below are illustrated by XML-listings, XML-registries are only one of a variety of possibilities to implement the present invention.

For the sake of simplicity, the SOA-application represented by the SOA-application description A1 in FIG. 1 is extremely simplified in order to explain the invention. It should be apparent that a SOA-application may be much more complex and may in some cases comprise e.g. 1,000 or more different components.

A more concrete example of a SOA-application is shown in FIG. 2, namely a dictionary application for reading an electronic dictionary over the internet, which is maintained by web services. The exemplary application thus comprises four abstract component descriptions defining three services (Service:Read, Service:Write, Service:Delete) for reading, writing and deleting dictionary entries, as well as a web application (WebApp:Browse) for browsing the dictionary. Each of the abstract component descriptions is related to a number of concrete component descriptions, i.e. concrete implementations (R1-R4, W1-W2, D1-D3, B1-B2) of the services and the web application.

The exemplary dictionary application is to be deployed onto two platforms, which are described in the SOA-registry 1 by two platform descriptors P1, P2. A platform descriptor P1, P2 may comprise properties, i.e. information, of the specifics of the corresponding platform such as platform components the platform provides (e.g. the operating system including its version, the available runtime environments, application servers, servlet engines, etc.). As can be seen from FIG. 3, the platform descriptor P1 defines that the corresponding platform runs an operating system Solaris in version 10, provides the programming language Java 1.4.2 Update 7, has a servlet engine Tomcat 5.5.1.17, a web service stack Axis v21.4 and two databases, namely Tamino 4.4 and Oracle.

In certain embodiments, the platform properties may be stored as XML-entries in the SOA-registry 1 which may conform e.g. to the Java API for XML registries (JAXR) standard. Some registry standards already comprise a number of predefined types of registry entries, but may not comprise the type "platform descriptor".

To this end, the SOA-registry 1 may be extended with user-defined types in the form of taxonomies. A taxonomy defines a tree-like structure of concepts and registry-entries may be classified by taxonomy-concepts through references. FIG. 4 shows an example of two taxonomies, namely a taxonomy OS which categorizes different operating systems and a taxonomy DBS which categorizes different database systems. FIG. 4 also depicts the exemplary platform descriptor P1, which comprises references to the taxonomy-entries in order to define which platform components are provided by the corresponding platform. In the depicted example, the platform defined by the platform descriptor P1 runs Solaris 10 and has two database systems (Tamino 4.4 and Oracle) installed. It should be appreciated that the platform properties shown in FIGS. 3 and 4 are extremely simplified. Much more complex definitions are possible e.g. by describing the platform properties in an ontology using the Web Ontology Language (OWL).

As already mentioned above, the concrete component descriptions CC11, CC12, CC21, CC22, CC31 may define requirements of the corresponding SOA-application components on specific platforms. E.g. a certain service may be adapted to run only on specific versions of a web service stack. The requirements may, as well as the platform proper-ties, be defined in an ontology, e.g. in the above mentioned OWL. FIG. 5 shows a simplified requirements definition of the exemplary concrete component description of the component R1 from FIG. 2 (which is a concrete implementation of Service:Read). For the sake of simplicity, FIG. 5 shows a very simple example in XML. Much more complex requirement definitions are possible by ontology languages like OWL. As can be seen, FIG. 5 defines that the component R1 needs Solaris at least in version 9, Java 1.4.2 with either update 7 or 9, Tomcat in any version starting with 5.5, Axis as Axis2 in any sub-version and a Tamino database in any version. To this end, the requirements may be specified by connecting the names and/or version numbers of required platform components with logical operators, such as "greater than", "and", "or", etc. It should be appreciated that the examples described herein only show a small selection of requirement definitions and that more complex definitions are possible with the present invention.

In order to store the above explained requirements information in the SOA-registry 1, a number of alternatives are possible. One of the possibilities is storing the requirement definitions as XML documents in a separate repository and linking the registry-entries via references.

With the above described information, a deployment procedure may be performed, which deploys an exemplary SOA-application defined by the SOA-application description A1 onto a platform defined by the platform descriptor P1. The deployment procedure is preferably performed by a module called platform manager, but may well be implemented in any other way.

In prior art approaches, a SOA-registry may only store concrete component descriptions of the application components adapted for a specific platform. Prior art installers like e.g. msi, InstallShield, etc. may then deploy an application by deploying each of the concrete components based on this information. However, the fact that all information necessary for deploying is available in a structured and platform-independent form in the registry 1 allows for more automation, especially when deploying onto more than one target platform.

With the two-layered data-model in the SOA-registry 1 according to the present invention, the deployment procedure may be applied upon an abstract description A1 of the application together with the description of a target platform P1. For each of the abstract components AC1, AC2, AC3 of the application, a concrete implementation may then be searched among the concrete component descriptions CC11, CC12, CC21, CC22, CC31, which is suitable for the specific target platform. If none is found, the deployment procedure may stop and a report may be generated which comprises reasons for the interruption of the deployment. In case of success, the report may comprise a summary of the deployment, i.e. a description of which components have been deployed and which platform components have been actually needed by the selected constellation. Furthermore, a concrete component description CC11, CC12, CC21, CC22, CC31 or an abstract component description AC1, AC2, AC3 may comprise further information, which is included into the report if the corresponding component has been selected.

Referring to the example in FIG. 2, first a concrete component is needed which implements Service:Read. The concrete component descriptions CC11, CC12, CC21, CC22, CC31 may, in some embodiments, comprise a sequence number in order to determine a deployment sequence. In the example of FIG. 2, the concrete component R1 may thus be the first component according to the sequence. The requirements of the component R1 are tested against the platform properties. Since the platform defined by the platform descriptor P1 satisfies the requirements of the concrete component R1, R1 is selected as implementation of Service:Read. The procedure then proceeds with the next abstract component description (Service:Write) and so forth.

In a particularly preferred embodiment, both the requirements of the concrete components and the properties of the platforms are defined by ontologies, e.g. using the Web Ontology Language (OWL), as described above. The platform manager may then automatically test the requirements against the platform properties by inference. Inference is a method in computer science which allows for the automatic deriving of conclusions from logical statements, which is especially advantageous in the context of the above described ontologies.

If preferably at least one concrete component is found for each of the abstract components of the application, the concrete components are finally deployed onto the platform, otherwise none of the components is deployed. It may however be appreciated that other deployment procedures, e.g. for partial deployments, are also possible with the present invention.

In the example above, the deployment report may comprise the information that the concrete component R1 was selected for the abstract component Service:Read, that Solaris in version 9 would have been sufficient and that the Oracle database is not needed.

A deployment of the exemplary application A1 onto the platform P2, however, could not use the concrete component R1, since the Java version does not match (the platform P2 only offers Java 1.4.2 Update 8, see FIG. 3). The report may thus comprise this information, as depicted in FIG. 6.

An especially advantageous feature of the present invention is the automatic redeployment of an application onto a number of different platforms, as explained above. This is achieved in that the application is defined one time in platform-independent (abstract) terms in the SOA-registry 1 and a number of different concrete implementations are provided for preferably each of the abstract component descriptions of the application.

Furthermore, the present invention is not limited to the deployment of one single SOA-application. On the contrary, more than one SOA-application may be described in the SOA-registry 1, wherein the SOA-applications may have overlapping functionalities, i.e. the SOA-application descriptions may be related to shared abstract component descriptions. In this case, the relationships between abstract and concrete components may be shared among the SOA-applications.

The invention claimed is:

1. A service oriented architecture (SOA) computing system for the automatic deployment of at least one SOA-application onto at least one platform, the at least one SOA-application comprising one or more components, the computing system comprising:
   a non-transitory storage system that is configured to store an SOA registry that comprises:
      at least one SOA-application description being related to one or more platform-independent component descriptions describing the components of the at least one SOA-application;
      at least one platform-specific component description for each of the one or more platform-independent component descriptions, the at least one platform-specific component description comprising one or more requirements of the respective component on a target platform, the one or more requirements including names and/or version numbers of required platform components and at least one logical operator; and
      at least one platform descriptor comprising one or more properties of the at least one platform,
   wherein the one or more platform-independent component descriptions, the at least one platform-specific component descriptions and/or the at least one platform descriptors comprise a name and/or a type.

2. The SOA-registry of claim 1, wherein the one or more properties of the at least one platform are stored as entries in at least one taxonomy of the SOA-registry and wherein the at least one platform descriptor comprises references to the entries.

3. The SOA-registry of claim 1, wherein the one or more requirements and/or the one or more properties of the at least one platform are described by at least one ontology.

4. The SOA-registry of claim 1, wherein the at least one platform-specific component description comprises a sequence number for determining a deployment sequence.

5. The SOA-registry of claim 1, wherein the one or more requirements are stored outside the SOA-registry and the at least one platform-specific component description comprises references to the requirements.

6. The SOA-registry of claim 1, wherein the SOA-registry is distributed among a plurality of SOA-registries.

7. The service oriented architecture (SOA) computing system of claim 1, wherein:
   the deployed first component is specifically configured to operate with the first platform in accordance with the selected associated platform-specific component description.

8. The service oriented architecture (SOA) computing system of claim 1, further comprising:
   a processing system that includes at least one processor, the processing system configured to:
      select a first SOA-application description of a first SOA-application from among the at least one SOA-application description stored in the SOA-registry;
      select a first platform descriptor of a first platform from the at least one platform description of the SOA-registry;
      for each one of the one or more platform-independent component descriptions associated with the first SOA-application description, select an associated platform-specific component description in accordance with the selected first platform descriptor and the included requirements thereof; and
      deploy a first component that corresponds to the selected associated platform-specific component description to the first platform in accordance with the one or more requirements of the first component.

9. The SOA-registry of claim 1, wherein each said platform descriptor corresponds to exactly one of said platforms.

10. A method for the automatic deployment of at least one service oriented architecture (SOA)-application onto at least one platform using an SOA registry that comprises at least one SOA-application description that is related to one or more platform-independent component descriptions, at least one platform-specific component description comprising one or more requirements of the respective component on a target platform, where the one or more requirements includes names and/or version numbers of required platform components and at least one logical operator, the at least one platform-specific component description associated with each one of the platform-independent component descriptions, the SOA registry comprising at least one platform descriptor defining one or more properties of a respective platform, the at least one SOA-application comprising one or more components, the method comprising:

selecting an SOA-application description of the at least one SOA-application and a platform descriptor of the at least one platform descriptor from the SOA-registry;

for each of the one or more platform-independent component descriptions related to the selected application description, selecting, via a computing system that includes at least one processor, one of the at least one platform-specific component descriptions that is associated with the corresponding platform-independent component description; and deploying, via the computing system, components corresponding to the selected at least one platform-specific component descriptions, and the included one or more requirements, onto a platform that is in accordance with the platform descriptor, wherein the one or more platform-independent component descriptions, the at least one platform-specific component descriptions and/or the at least one platform descriptor comprise a name and/or a type.

11. The method of claim 10, furthering comprising:

testing, for each of the at least one platform-specific component descriptions, if the one or more requirements are satisfied by the platform corresponding to the platform descriptor; and selecting a first matching platform-specific component description based on the test.

12. The method of claim 11, wherein the testing is performed by comparing the one or more requirements and the one or more properties of the at least one platform by inference.

13. The method of claim 10, wherein deployment is only performed if, for each of the one or more platform-independent component descriptions, at least one of the platform-specific component descriptions can be selected.

14. The method of claim 10, further comprising generating a report describing which component has been deployed for each of the one or more platform-independent component descriptions.

15. A non-transitory storage medium comprising computer executable instructions for use with a platform manager used for the automatic deployment of a service oriented architecture (SOA)-application onto at least one platform using an SOA-registry that is stored in a storage system, the SOA-registry including an SOA-application description of the SOA-application, the SOA-application description being related to a plurality of platform-independent component descriptions, the plurality of platform-independent component descriptions each having at least one corresponding platform-specific component description, the SOA-registry including a plurality of platform descriptors, each one of which being associated with a corresponding target platform, the platform-specific component descriptions of the SOA registry include at least one requirement of the respective component for a target platform, the at least one requirement including names and/or version numbers of required platform components and any number of logical operators, the SOA-application comprising a plurality of components, each one of which corresponds to one or more platform-specific component descriptions, the platform manager comprising instructions configured to:

select the SOA-application description of the SOA-application from the SOA-registry;

select a first platform descriptor of a first platform from the plurality of platform descriptors of the SOA-registry;

determine the plurality of platform-independent component descriptions associated with the SOA-application description;

for each one of the determined plurality of platform-independent component descriptions, select the corresponding platform-specific component description and the associated at least one requirement that includes names and/or version numbers of the required platform components and at least one logical operator; and deploy a first component that corresponds to the selected corresponding platform-specific component description to the first platform in accordance with the associated at least one requirement, wherein the plurality of platform-independent component descriptions, the platform-specific component descriptions, and/or the plurality of platform descriptors comprise a name and/or a type.

\* \* \* \* \*